June 4, 1929.  C. B. BACKER  1,715,692
HEATER UNIT
Filed Oct. 20, 1927
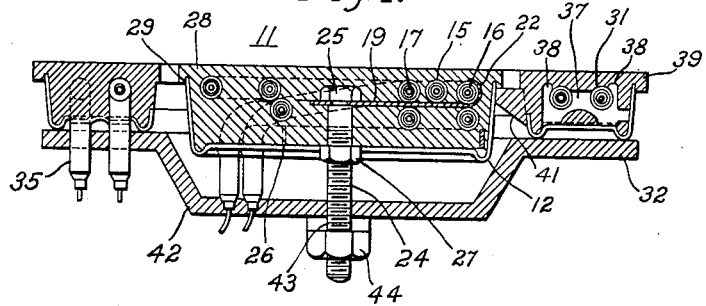
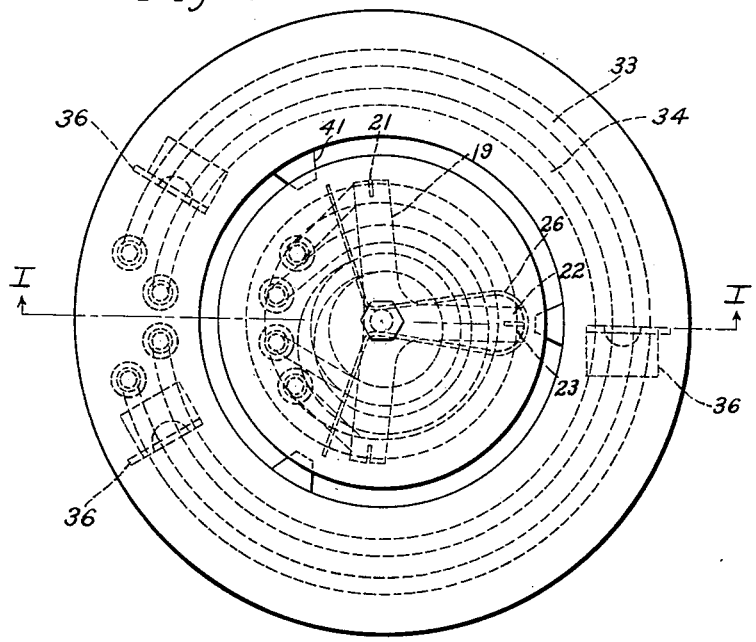
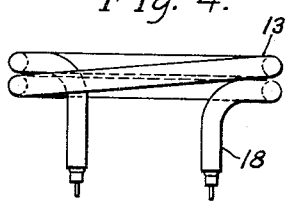 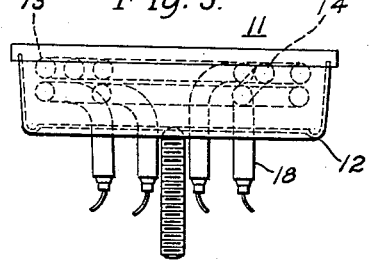 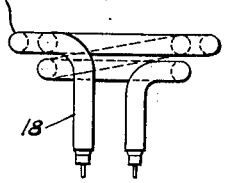
INVENTOR
Christian B. Backer.
BY
ATTORNEY Patented June 4, 1929.

1,715,692

UNITED STATES PATENT OFFICE.

CHRISTIAN B. BACKER, OF BROOKLYN, NEW YORK.

HEATER UNIT.

Application filed October 20, 1927, Serial No. 227,443, and in Great Britain January 28, 1927.

My invention relates to electric heating appliances, and particularly to electric heating units.

An object of my invention is to provide a relatively simple, compact and inexpensive flat heater.

Another object of my invention is to provide a highly efficient heater embodying a tubular, metal-encased heating element and a cast-metal filling therearound.

Another object of my invention is to provide a relatively simple plural-heater assembly embodying a central heating unit of circular shape and an outer annular heating unit.

In practicing my invention, I provide a sheet-metal base plate, a plurality of metal-encased tubular heating elements therein, a bracket, and a spacing member, preferably made of sheet metal, for holding the tubular heating elements in proper operative positions relatively to the base plate, and a filling of cast metal surrounding the tubular heating element, the bracket and the spacer, and having a substantially smooth upper surface.

In a plural-heater-unit assembly, a circular inner heating unit of this type is located coaxially with an outer annular heating unit, the cast metal filling of the inner heating unit embodying an outer peripheral shoulder portion, and the outer annular heating unit embodying a plurality of inwardly extending lugs integral with the cast-metal filling, the shoulder and the lugs cooperating with each other to hold the two heating units in proper operative positions relatively to each other, both coaxially and radially, and a metal skeleton form for clamping the heaters in proper operative positions relatively to each other.

In the single sheet of drawing:

Figure 1 is a view, in longitudinal section, through a plural-part heater embodying my invention, the section being taken on the line I—I of Fig. 2, Fig. 2 is a top plan view thereof, Fig. 3 is a view, in side elevation, of the inner heating unit, Fig. 4 is a view, in side elevation, of an outer heating element, and, Fig. 5 is a view, in side elevation, of an inner heating element.

An inner heating unit 11 comprises a sheet-metal cup 12, preferably made of mild steel. A plurality of metal-encased tubular heating elements 13 and 14 are located within the member 12 and respectively embodying an outer tubular metal casing 15, a filling 16 therein of electric insulating material and a resistor 17 of substantially helical-shape and substantially coextensive with the length of the casing 15. The two heating elements 13 and 14 are made in accordance with my invention disclosed and claimed in United States reissued Patent No. 16,340.

Briefly, the method therein described of making a heating element of this type comprises winding the resistor wire 17 into helical form, surrounding the helix with an open helix of magnesium strip, locating these helices within a metal tube 15 of suitable dimensions and then subjecting the assembly to the action of high-temperature steam or water, under suitable pressure. The metallic magnesium is transformed into a substantially crystalline structure of magnesium hydroxide or oxide, the volume of which is substantially twice that of the metallic magnesium. The helix of resistor wire is thus held tightly within the metal tube 15 by a crystalline mass of magnesium hydroxide or oxide, generated or made, in situ, thereby providing not only an electric-insulating holding means surrounding the resistor wire, but providing also a highly-conducting heat path from the resistor wire to the tubular member 15.

The length of the heating element is the same in each of the two heating elements hereinbefore described and I prefer to locate these two heating elements in substantially the same plane and also in substantially concentric relation.

It is highly desirable, in heating units of this kind embodying a plurality of individual heating elements, that the resistance, and, therefore, the lengths thereof, be substantially the same in order that the two heating units may be connected either in series-circuit relation, or in parallel-circuit relation in order to provide a multi-heat heating unit. Furthermore, if the heating elements are of the same length, they can be more easily manufactured.

Reference to Figs. 4 and 5 of the drawings will show the respective shapes of the two heating elements which I have found preferable in thus providing concentrically related annular heating elements of the same resistance and length.

It is preferable, of course, to bring out all of the end or terminal portions of the heating elements close together in order that supply-circuit conductors may also be located relatively close together, and the end portions 18 of the respective heating elements are located close together and on an arcuate line, substantially as shown in Fig. 2 of the drawings. The end portions 18 are bent downwardly out of the plane of the heating elements and extend through suitable openings in the base plate 12, the tubular metal casing filling these openings snugly or fitting tightly therein.

Supporting means for the plurality of heating elements 13 and 14 embodies a metal bracket 19 made, preferably, of relatively thin sheet metal and of substantially T-shape. The end portion of each of the arms of the bracket 19 is slotted radially, as indicated at 21 in Fig. 2, one portion 22 thus provided by the slot 21 being bent upwardly, as shown in Fig. 1 of the drawing, around one portion of the outer turn of the heating element 13, and the other portion 23 being bent downwardly, around a portion of another outer turn. The central portion of the member 19 is bolted to the upper end of a stud 24 which is located coaxially with the base plate 12 and which extends upwardly therethrough, a nut 25 being provided to clamp the member 19 against a shoulder portion.

A spacing member 26, made of a bent strip of sheet metal, is provided, the shape being substantially that of the letter T. The member 26 is located between the lowermost turns of the heating elements 13 and 14 and the bottom of the plate 12. A nut 27 is located on the stud 24 and is screwed tightly thereon against the bottom of the member 12. This holds the heating elements 13 and 14 in proper operative positions relatively to the base plate 12.

A filling 28 of cast metal is provided within the base plate 12 and surrounds the heating elements 13 and 14, the bracket 19, the spacer 26, the upper end of the stud 24 and the nut 25. The supporting and spacing means hereinbefore described for holding the heating elements in proper operative positions within the base plate 12 will, of course, be effective during the operation of locating the base plate, the heating elements and the supporting and spacing means in a mold preparatory to casting the filling 28 in the base plate 12.

The filling 28 is of such shape as to provide an outer annular shoulder portion 29 adjacent to the upper surface edge and extending slightly beyond the upper edge of the member 12, of cup shape.

An outer annular heating unit 31 comprises a member 32 of sheet metal and of substantially channel-shape in lateral section, a pair of tubular heating elements 33 and 34 located therein and in the same horizontal plane as are the upper turns of the heating elements 13 and 14 in the inner heating unit 11.

The two heating elements 33 and 34 embody substantially the same construction as has been hereinbefore described for the heating elements 13 and 14. Their end portions 35 are bent downwardly and extend through suitable openings in the base plate 32, the end portions being located closely together, as is shown more particularly in Fig. 2 of the drawings.

Means for initially supporting the heating elements 33 and 34 within the base plate 32 and for maintaining them in proper spaced relation relatively to the base plate, comprise a plurality of peripherally-spaced sheet-metal brackets 36, each of substantially L-shape in lateral section. One leg portion thereof extends parallel to the bottom of the base plate 32 and may be spot welded thereto. The other, substantially vertically extending leg portion 37 is provided with a pair of spaced recesses at its upper edge of such shape as to receive the heating elements 33 and 34 therein. End portions 38 are provided which may be bent over the tubular casing of the heating elements 33 and 34 in order to prevent their moving out of the recesses during the casting operation.

A filling 39 of cast metal is provided which fills the bracket 32 and extends slightly beyond the upper edge of the rim portions thereof, thus surrounding the supporting brackets and the heating elements.

A plurality of lugs 41 are cast integral with the filling 39 and extend radially inwardly, the length and vertical position of these lugs 41 being such that they interfit with the flange portion 29 of the inner heating unit 11 and more particularly of the cast-metal filling 28. The cooperation of the flange or shoulder portion 29 and the lugs 41 is such as to maintain the two heating units 11 and 31 in proper operative concentric positions and with the finished plane upper surfaces in substantially a single plane.

A skeleton frame or spider 42 is provided, which consists of a punched or cast-metal bar having either two or three arms, the central portion thereof having an opening 43 through which the stud 24 extends, a nut 44 being provided thereon to permit of effecting a clamping action between the outer ends of the arms against the lower surface of the base plate 32. As the nut 44 is tightened, the outer faces of the lugs 41 engage the peripheral surface of the base plate 12, and the upper faces of the lugs 41 are pressed against the shoulder portion 29, as is shown more particularly in Fig. 1 of the drawing.

The upper surface of the cast-metal fillings 28 and 39 may be ground and polished in any suitable or desired manner to provide a smooth and plane upper surface upon which a cooking utensil may be placed.

I have found that a metal filling of cast iron may be made to adhere closely to the inner surface of the base plate by tinning the inner surfaces thereof before the casting operation. The same process may be effected with regard to the outer surface of the heating-element casing and of the supporting brackets, the object being to obtain an adherence of the cast-metal filling to these elements in order to provide a heat path of low thermal resistance from the outer surface of the tubular heating elements through the cast metal and from there to the upper surface of the filling. When this object has been accomplished, the temperature drop or gradient from the heating elements to the upper surface of the heating units will be relatively small, and, as has been hereinbefore stated, the construction of the tubular heating elements themselves is such as to provide a path of low thermal resistance from the resistor wire to the tubular metal casing. The general result is that the temperature of the resistor wire itself is relatively little above that of the operating surface of the heating units and this, in turn, means that the resistor wire itself will have a long operating life.

I have found that a heater of this type may be made easily and at relatively small expense and that it is possible also to obtain a higher operating temperature at the upper surface of the heating unit, without danger to the resistor wire 1 than would otherwise be possible.

The particular conformation of the respective turns of the heating elements 13 and 14 are the result of extensive study of the problem of providing a plurality of heating elements in the inner central heating unit that shall be of relatively high capacity as regards electric energy input transformed into heat.

The heating unit 11 is approximately 4" in diameter and the conformations of the two tubular heating elements illustrated in Figs. 4 and 5 are the preferred forms, and, in reality, are the only forms which I have been able to devise thus far that will permit of embedding two tubular heating elements, each of approximately 20" length, in a plate substantially 4" in diameter.

It is, of course, obvious that either the central heating unit alone may be energized, or that both heating units may be energized in accordance with the size of the food container placed thereon.

Various modifications may be made in the device embodying my invention without departing from the spirit and scope thereof and I desire, therefore, that only such limitations shall be placed thereon as are imposed by the prior art or are specifically set forth in the appended claims.

I claim as my invention:

1. A flat electric heater comprising a sheet-metal base plate, a tubular heating element on said base plate comprising a metal sheath, a resistor therein and a filling of crystalline magnesium oxide, a sheet-metal bracket for supporting said heating element in spaced relation to the base plate, and a mass of cast metal on said plate surrounding the bracket and the tubular heating element.

2. An electric heater comprising a circular sheet-metal base plate, a stud extending co-axially through said plate, a plural-arm heating-element-supporting bracket secured to the upper end of the stud, a tubular heating element supported by said supporting bracket, and a mass of cast metal on said base plate surrounding said heating element, supporting bracket and the upper end of said stud.

3. An electric heater comprising a sheet-metal base plate, a tubular heating element embodying a plurality of turns located one above the other, a mass of cast metal on said base plate surrounding said heating elements, and means for positioning and supporting said heating element on said base plate and in said cast metal comprising a screw-threaded rod coaxial with the plate, and a metal bracket, of substantially T-shape, having its central portion secured to the upper end of the stud and having the outer ends of its arms slotted radially, one portion being bent downwardly to encircle one turn of the heating element and the other portion being bent upwardly to encircle the other turn of the heating element.

4. An electric heater comprising a sheet-metal base plate, a tubular heating element in said base plate and having its end portions extending downwardly through the base plate, a filling of cast metal in said base plate surrounding said tubular heating element, and a bracket on said base plate for holding the tubular heating element in proper operative position relatively to the bottom and side walls of the base plate.

5. In an electric heater, the combination with an inner heating unit comprising a sheet-metal base plate of substantially cup-shape, a screw-threaded rod extending co-axially through said base plate, a tubular heating element in the base plate, a bracket for supporting said heating element secured to the upper end of the rod, a filling of cast metal in said base plate and an outer annular heating unit, of means for holding the annular heating unit in proper operative cooperating radial extensions on the inner and the outer heating units, a skeleton frame having its outer ends operatively engaging the bottom surface of the outer heating unit and its central portion extending around said rod, and a nut on the rod for pressing the frame upwardly relatively to the rod.

6. In an electric heater, the combination with an inner circular heater unit comprising a sheet-metal base plate, a metal-encased tubular heating element thereon, a bracket of substantially T-shape for supporting the tubular heating element, a stud extending downwardly through the base plate and having the bracket secured to its upper end and a filling of cast metal in said base plate, said filling embodying an over-hanging external peripheral shoulder, of an outer annular heater unit comprising a sheet-metal base plate, recessed brackets in the base plate, a metal encased tubular heating element extending through the recesses in the brackets, a filling of cast metal in the base plate, said filling embodying inwardly extending lugs fitting below said peripheral shoulder, and means for holding the two heaters in proper operative positions relatively to each other comprising a skeleton frame surrounding the stud and engaging the lower surface of the outer heater unit and a nut on said stud.

7. An electric heater comprising a sheet-metal base plate, a plurality of concentric tubular heating elements thereon, a stud extending through the base plate, a bracket secured to the upper end of the stud and supporting the heating elements, a spacing member located between the base plate and the heating elements, and a cast-metal filling in the base plate surrounding the heating elements, the bracket, the spacing member and the upper end-portion of the stud.

In testimony whereof, I have hereunto subscribed my name this 10th day of October, 1927.

CHRISTIAN B. BACKER.